United States Patent
Park et al.

(10) Patent No.: US 10,322,716 B2
(45) Date of Patent: Jun. 18, 2019

(54) HYBRID ELECTRIC VEHICLE CAPABLE OF MAXIMIZING DRIVING DISTANCE IN ENGINE CLUTCH FAILURE SITUATION AND METHOD OF CONTROLLING THE SAME

(71) Applicants: HYUNDAI MOTOR COMPANY, Seoul (KR); KIA MOTORS CORPORATION, Seoul (KR)

(72) Inventors: Joon Young Park, Seoul (KR); Yeon Bok Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/822,720

(22) Filed: Nov. 27, 2017

(65) Prior Publication Data

US 2018/0354499 A1   Dec. 13, 2018

(30) Foreign Application Priority Data

Jun. 8, 2017   (KR) .......................... 10-2017-0071473

(51) Int. Cl.
*B60W 20/50* (2016.01)
*B60K 6/387* (2007.10)
(Continued)

(52) U.S. Cl.
CPC .............. *B60W 20/50* (2013.01); *B60K 6/387* (2013.01); *B60K 6/48* (2013.01); *B60W 10/02* (2013.01); *B60W 10/10* (2013.01); *B60K 6/442* (2013.01); *B60K 2006/4825* (2013.01); *B60W 10/06* (2013.01); *B60W 10/08* (2013.01); *B60W 20/20* (2013.01); *B60W 2510/0208* (2013.01); *B60W 2510/0275* (2013.01);
(Continued)

(58) Field of Classification Search
CPC ....... B60W 20/50; B60W 10/10; B60W 10/02
See application file for complete search history.

(56) References Cited

U.S. PATENT DOCUMENTS 6,176,808 B1 * 1/2001 Brown ................... B60K 6/365
                                                                180/65.25
6,244,368 B1 * 6/2001 Ando ....................... B60K 6/48
                                                                180/65.25

(Continued)

FOREIGN PATENT DOCUMENTS

WO       2009/139305 A1    11/2009

*Primary Examiner* — James A Shriver, II
*Assistant Examiner* — James J Triggs
(74) *Attorney, Agent, or Firm* — Morgan Lewis & Bockius LLP

(57) ABSTRACT

A hybrid electric vehicle which may maximize a driving distance in an engine clutch failure situation and a method of controlling the same are disclosed. The method of controlling the hybrid electric vehicle provided with an engine clutch installed between a first motor and an engine includes, in response to a determination that failure of the engine clutch occurs, determining a state of the engine clutch just prior to the failure, in response to a determination that the state of the engine clutch just prior to the failure is an open state, driving the first motor alone, and in response to a determination that the state of the engine clutch just prior to the failure is not the open state, starting the engine.

19 Claims, 6 Drawing Sheets

(51) Int. Cl.
    *B60K 6/48*        (2007.10)
    *B60W 10/02*     (2006.01)
    *B60W 10/10*     (2012.01)
    *B60K 6/442*      (2007.10)
    *B60W 10/06*     (2006.01)
    *B60W 10/08*     (2006.01)
    *B60W 20/20*     (2016.01)

(52) U.S. Cl.
    CPC ... *B60W 2510/081* (2013.01); *B60W 2530/14* (2013.01); *B60W 2710/0666* (2013.01); *B60W 2710/083* (2013.01); *F16D 2500/30401* (2013.01); *F16D 2500/5114* (2013.01)

(56) References Cited

U.S. PATENT DOCUMENTS

| | | | |
|---|---|---|---|
| 8,298,117 B2 * | 10/2012 | Seel | B60K 6/48 477/5 |
| 8,579,758 B2 * | 11/2013 | Seel | B60K 6/365 477/5 |
| 9,707,954 B2 * | 7/2017 | Fuechtner | B60K 6/48 |
| 9,758,152 B2 * | 9/2017 | Schule | B60W 10/06 |
| 2003/0004032 A1 * | 1/2003 | Tamor | B60K 6/48 477/5 |
| 2011/0125356 A1 | 5/2011 | Takahashi | |
| 2015/0321663 A1 | 11/2015 | Kim et al. | |
| 2017/0113679 A1 | 4/2017 | Hata et al. | |

\* cited by examiner

HYBRID ELECTRIC VEHICLE CAPABLE OF MAXIMIZING DRIVING DISTANCE IN ENGINE CLUTCH FAILURE SITUATION AND METHOD OF CONTROLLING THE SAME

This application claims the benefit of Korean Patent Application No. 10-2017-0071473, filed on Jun. 8, 2017, which is hereby incorporated by reference as if fully set forth herein.

TECHNICAL FIELD

The present disclosure relates to a hybrid electric vehicle and a method of controlling the same, and more particularly, to a hybrid electric vehicle which may maximize a driving distance in an engine clutch failure situation and a method of controlling the same.

BACKGROUND

In general, a hybrid electric vehicle (HEV) is a vehicle which uses two types of power sources, and the two types of power sources are mainly an engine and an electric motor. Such a hybrid electric vehicle has excellent fuel efficiency and power performance and is advantageous in reduction in exhaust gas, as compared to a vehicle provided with an internal combustion engine alone, and thus has been vigorously developed.

A hybrid electric vehicle may be operated in two driving modes according to types of powertrains which are driven. One is an electric vehicle (EV) mode in which the hybrid electric vehicle is driven using only the electric motor, and the other is a hybrid electric vehicle (HEV) mode in which the hybrid electric vehicle is driven by operating both the electric motor and the engine. In a hybrid electric vehicle employing a parallel type hybrid system in which an electric motor and an engine clutch (EC) are installed between an engine and a transmission, the engine clutch is in an open state in the EV mode and is in a closed state in the HEV mode. The closed state may be divided into a slip state in which slip between clutch plates is allowed and thus RPMs (revolutions per minute) of an input terminal and an output terminal may be different, and a lockup state in which RPMs of the input terminal and the output terminal are the same through direct connection of the clutch plates.

However, fixture of the engine clutch to an arbitrary state (hereinafter, referred to as "stuck" for convenience of description) due to mechanical failure or an error in control may occur. Particularly, stuck becomes worse if, when the state of a dry engine clutch is changed for improvement of fuel efficiency, a self-locking structure for maintaining the corresponding state without separate control is employed.

If such stuck or failure in which the state of the engine clutch cannot be determined occurs, the general hybrid electric vehicle is controlled so as to be driven using only the electric motor in all cases. However, such control forces the hybrid electric vehicle to be driven using only the electric motor regardless of the state of the engine clutch or a driving load and, thus, in some cases, may cause rapid battery consumption and difficulty in securing a sufficient moving distance of the hybrid electric vehicle to a safe zone in the event of failure and increasing the risk of accident.

SUMMARY

Accordingly, the present disclosure is directed to a hybrid electric vehicle and a method of controlling the same that substantially obviate one or more problems due to limitations and disadvantages of the related art.

An object of the present disclosure is to provide a hybrid electric vehicle which may maximize a driving distance in an engine clutch failure situation and a method of controlling the same.

Another object of the present disclosure is to provide a hybrid electric vehicle which may maximize a driving distance in consideration of a driving state of the vehicle in an engine clutch stuck situation and a method of controlling the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a method of controlling a hybrid electric vehicle provided with an engine clutch installed between a first motor and an engine includes, in response to a determination that failure of the engine clutch occurs, determining a state of the engine clutch just prior to the failure, in response to a determination that the state of the engine clutch just prior to the failure is an open state, driving the first motor alone, and in response to a determination that the state of the engine clutch just prior to the failure is not the open state, starting the engine.

In another aspect of the present disclosure, a hybrid electric vehicle includes a first controller configured to control a first motor, a second controller configured to control an engine, a third controller configured to control an engine clutch disposed between the first motor and the engine, and a fourth controller configured to: if failure of the engine clutch is detected by the third controller, determine a state of the engine clutch just prior to the failure, in response to a determination that the state of the engine clutch just prior to the failure is an open state, control the first controller to drive the first motor alone, and in response to a determination that the state of the engine clutch just prior to the failure is not the open state, control the second controller to start the engine.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
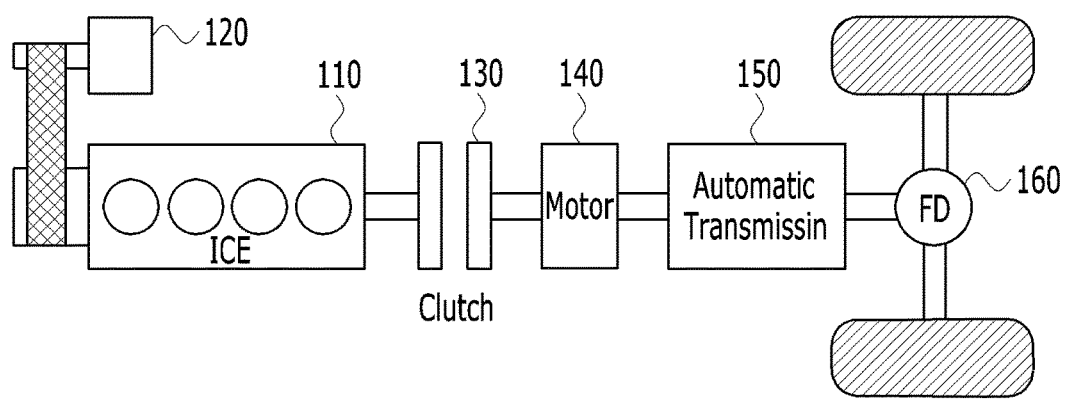
FIG. 1 is a schematic view exemplarily illustrating a powertrain structure of a parallel type hybrid electric vehicle.

Reference will now be made in detail to the preferred embodiments of the present disclosure, examples of which are illustrated in the accompanying drawings. In the drawings, the same or similar elements are denoted by the same reference numerals even though they are depicted in different drawings. The suffixes "module" and "unit" used in the description below are given or used together only in consideration of ease in preparation of the specification and do not have distinctive meanings or functions.

In the following description of the present disclosure, a detailed description of known functions and configurations incorporated herein will be omitted when it may make the subject matter of the present disclosure rather unclear. Further, the accompanying drawings are provided only for better understanding of the present disclosure and do not restrict the technical scope and spirit of the disclosure, and it is intended that the present disclosure cover the modifications and variations of the disclosure provided they come within the scope of the appended claims and their equivalents.

First, with reference to FIG. 1, a hybrid electric vehicle structure to which embodiments of the present disclosure are applicable will be described.

FIG. 1 is a schematic view exemplarily illustrating a powertrain structure of a parallel type hybrid electric vehicle to which the embodiments of the present disclosure are applicable.

FIG. 1 illustrates a powertrain of a hybrid electric vehicle employing a parallel type hybrid system in which an electric motor 140 (or a driving motor) and an engine clutch 130 are installed between an internal combustion engine (ICE) 110 and a transmission 150.

In such a vehicle, if a driver presses an accelerator after starting, the electric motor 140 is first driven using power of a main battery in an open state of the engine clutch 130 and then power of the electric motor 140 moves wheels via the transmission 150 and a final drive (FD) 160 (i.e., in the EV mode). If the vehicle is gradually accelerated and thus requires greater driving power, a starter generator motor 120 is operated and may thus drive the ICE 110.

Thereby, when RPMs of the ICE 110 and the electric motor 140 become equal, the engine clutch 130 is closed and the vehicle is driven by both the ICE 110 and the electric motor 140 (i.e., transition from the EV mode to the HEV mode). If predetermined engine off conditions are satisfied, i.e., the vehicle is decelerated, the engine clutch 130 is open and the ICE 110 is stopped (i.e., transition from the HEV mode to the EV mode). Here, the electric motor 140 charges the main battery using driving power of the wheels and this is referred to as brake energy regeneration or regenerative braking. Therefore, the starter generator motor 120 serves as a starter motor when the ICE 110 is started and serves as a generator when rotational energy of the engine is recovered after starting or when the ICE 110 is off, and may thus be referred to as a hybrid starter generator (HSG).

Figure 2:
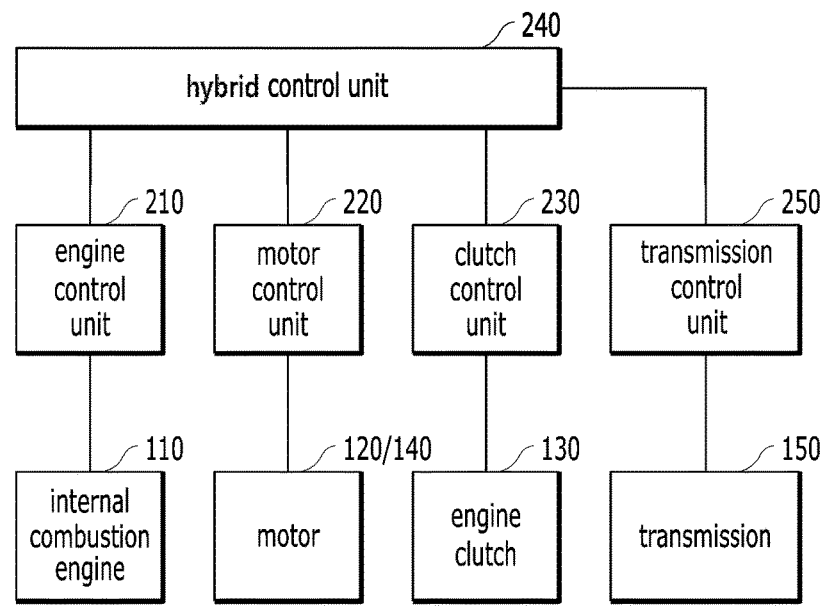
FIG. 2 is a block diagram exemplarily illustrating a control system of a hybrid electric vehicle to which embodiments of the present disclosure are applicable.

Mutual relations among control units in a vehicle to which the above-described powertrain is applied are illustrated in FIG. 2.

FIG. 2 is a block diagram exemplarily illustrating a control system of a hybrid electric vehicle to which embodiments of the present disclosure are applicable.

With reference to FIG. 2, in the hybrid electric vehicle to which embodiments of the present disclosure are applicable, an internal combustion engine 110 may be controlled by an engine control unit 210, torques of a starter generator motor 120 and an electric motor 140 may be controlled by a motor control unit (MCU) 220, and an engine clutch 130 may be controlled by a clutch control unit 230. Here, the engine control unit 210 may be referred to as an engine management system (EMS). Further, a transmission 150 is controlled by a transmission control unit 250. According to embodiments, the starter generator motor 120 and the electric motor 140 may be controlled by separate motor control units.

The respective control units are connected to an upper-level control unit, i.e., a control unit which performs overall control of the powertrain of the hybrid electric vehicle (hereinafter, a "hybrid control unit" or an "HCU") 240, and may thus provide information necessary to control the engine clutch 130 in driving mode conversion and gear shifting and/or information necessary to control stoppage of the internal combustion engine 110 to the hybrid control unit 240 or perform operation according to a control signal under the control of the hybrid control unit 240.

In more detail, the hybrid control unit 240 determines whether or not mode conversion is performed according to a driving state of the vehicle. For example, the hybrid control unit 240 determines a point of time when the engine clutch 130 is open, and performs hydraulic pressure control (if the engine clutch 130 is a wet engine clutch) or torque capacity control (if the engine clutch 130 is a dry engine clutch) when the engine clutch 130 is open. Further, the hybrid control unit 240 may determine a state (lock-up, slip, opening or stuck) of the engine clutch 130 through the clutch control unit 230, control a point of time when fuel injection of the internal combustion engine 110 is stopped, and determine whether or not engine stall occurs using information regarding the operating state of the internal combustion engine 110. Further, the hybrid control unit 240 may determine the operating states of the motors 120 and 140 through the motor control unit 220 and transmit torque commands of the respective motors 120 and 140 to the motor control unit 220.

Of course, connection relations between the above-described control units and functions/classifications of the respective control units are exemplary and thus it will be apparent to those skilled in the art that the names of the control units are not limited. For example, other control units except for the hybrid control unit 240 may be implemented as having the functions of the hybrid control unit 240, or the functions of the hybrid control unit 240 may be distributed to two or more other control units except for the hybrid control unit 240.

If a travel sensor to sense the position of an actuator moving clutch plates of the engine clutch 130 malfunctions or voltage lower than a normal value (i.e., a predetermined value) is supplied to the clutch control unit 230 controlling the engine clutch 130, a state of the engine clutch 130 based on the position of the actuator may not be determined (i.e., an unknown state). This will be described with reference to FIG. 3.

Figure 3:
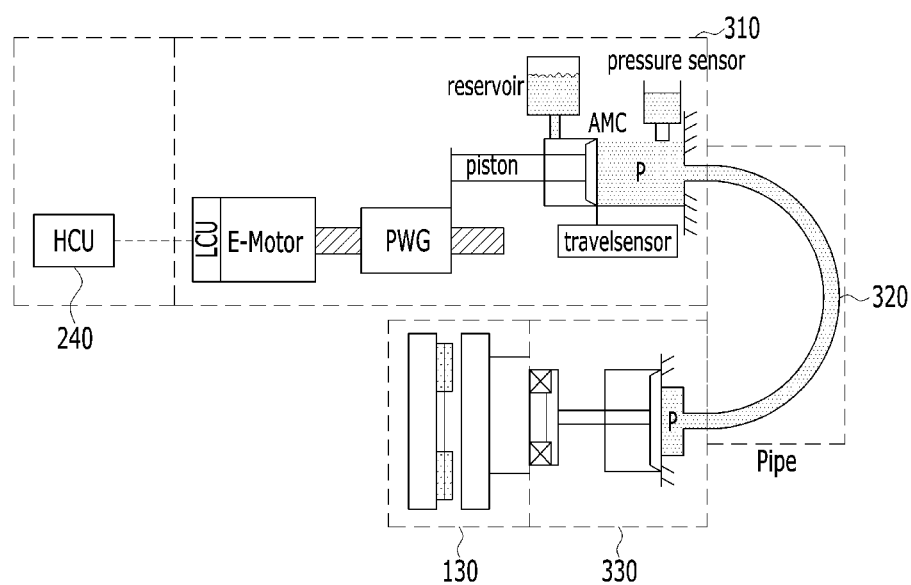
FIG. 3 is a view illustrating an operating principle of a dry engine clutch.

FIG. 3 is a view illustrating an operating principle of a dry engine clutch.

With reference to FIG. 3, in order to drive the engine clutch 130, a hydrostatic clutch actuator (HCA) 310, a central slave cylinder (CSC) 330, a pipe 320 providing a hydraulic pressure transmission path between the HCA 310 and the CSC 330 and a hybrid control unit (HCU) 240 are provided.

In more detail, the HCU 240 transmits a control command to the HCA 330, the HCA 330 moves a piston by driving an E-motor according to the control command, and hydraulic pressure is transmitted to the CSC 330 through the pipe 320 according to the position of the piston. The CSC 330 applies hydraulic pressure to the engine clutch 130 so that a distance between clutch plates may be changed.

If stuck of the engine clutch 130 occurs or failure of the engine clutch 130 in which the state of the engine clutch 130 may not be determined occurs, a general hybrid electric vehicle is controlled so as to be driven using only an electric motor in all cases. However, as described above, such control forces the hybrid electric vehicle to be driven using only the electric motor regardless of the state of the engine clutch or a driving load and, thus, in some cases, may cause rapid battery consumption and difficulty in securing a sufficient moving distance of the hybrid electric vehicle to a safe zone in the event of failure and increasing the risk of accident. This will be described in more detail with reference to FIG. 4.

Figure 4:
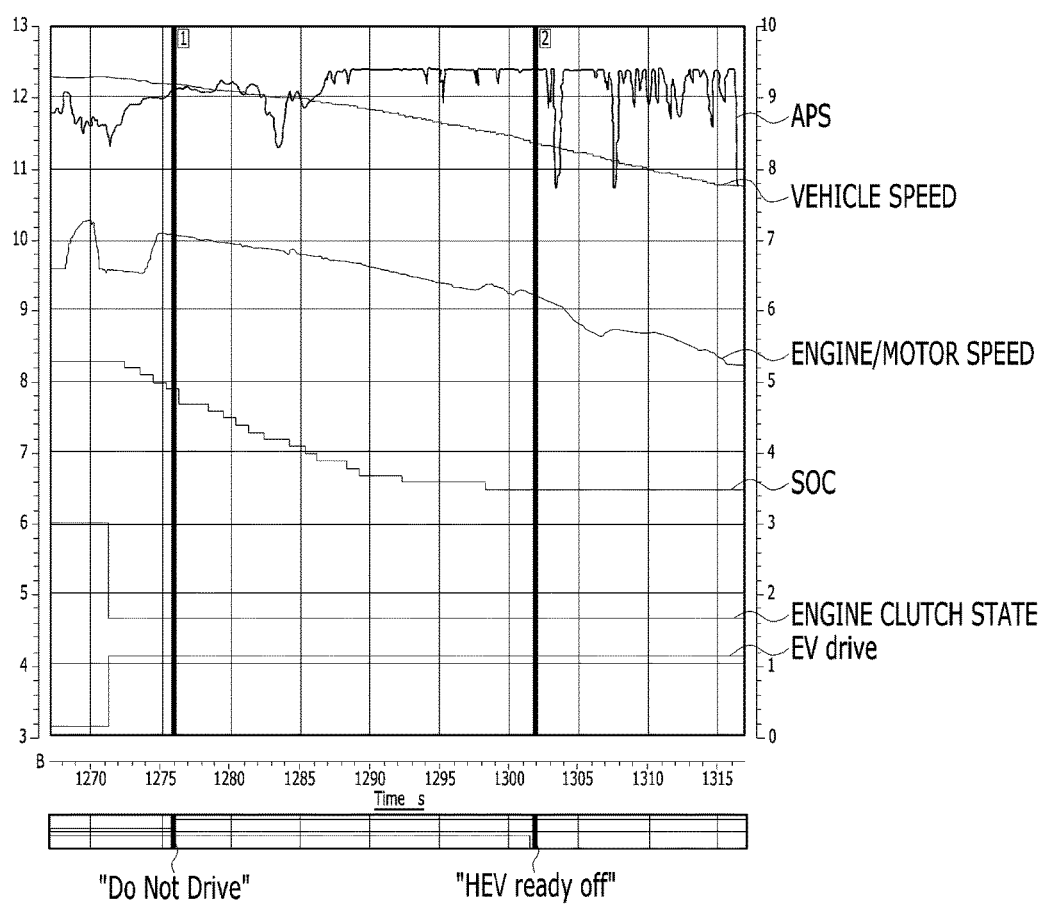
FIG. 4 is a view illustrating problems in driving control using only an electric motor in failure of an engine clutch.

FIG. 4 is a view illustrating problems in driving control using only an electric motor in failure of an engine clutch. In FIG. 4, a horizontal axis represents time in seconds, and a vertical axis represents change of various operating states.

With reference to FIG. 4, while a hybrid electric vehicle is driven uphill at a high speed in the HEV mode, unknown failure in which a state of the engine clutch may not be determined occurs around a point of about 1,270 seconds. When the engine clutch is stuck in the HEV mode, the engine clutch is maintained in the lock-up state and, thus, both the engine and the motor are rotated and the speeds thereof are continuously equal.

As such failure occurs, EV only control is performed (EV drive on). When EV only control is performed, the engine is off and, at this point of time, the speeds of the engine and the motor are temporarily decreased. Even if the engine is off, an accelerator pedal sensor (APS) value is maintained to be high and thus the electric motor is operated at a high load so as to satisfy required output, and thereby the speeds of the engine and the motor are immediately recovered. Further, after occurrence of failure, a warning of "do not drive" may be output, as shown in a lower graph of FIG. 4.

However, since it is difficult to cope with uphill driving at a high load using only output of the motor, a vehicle speed and the speeds of the engine and the motor are continuously lowered, and all the SOC (state of charge) of the battery is consumed within about 25 seconds from starting of EV only control (i.e., prior to 1,300 seconds on the horizontal axis) due to high-load operating of the motor. Thereby, the hybrid electric vehicle enters an "HEV ready off" state corresponding to an ignition-off state of a general combustion engine vehicle and driving of the hybrid electric vehicle is not enabled any more.

Consequently, when EV only control is performed in a high driving load situation, the engine clutch is locked up, the electric motor handling an engine load rapidly lowers the SOC of the battery and, thereby, a driver may not secure a time/distance to move the vehicle to a safe zone.

Therefore, in the embodiments of the present invention, a control method, in which exhaustion of the SOC of the battery is delayed through HSG charging control HSG according to the state of the engine clutch or torque of the engine is used in driving of wheels with reference to a state of the engine clutch just prior to failure, is proposed.

Figure 5:
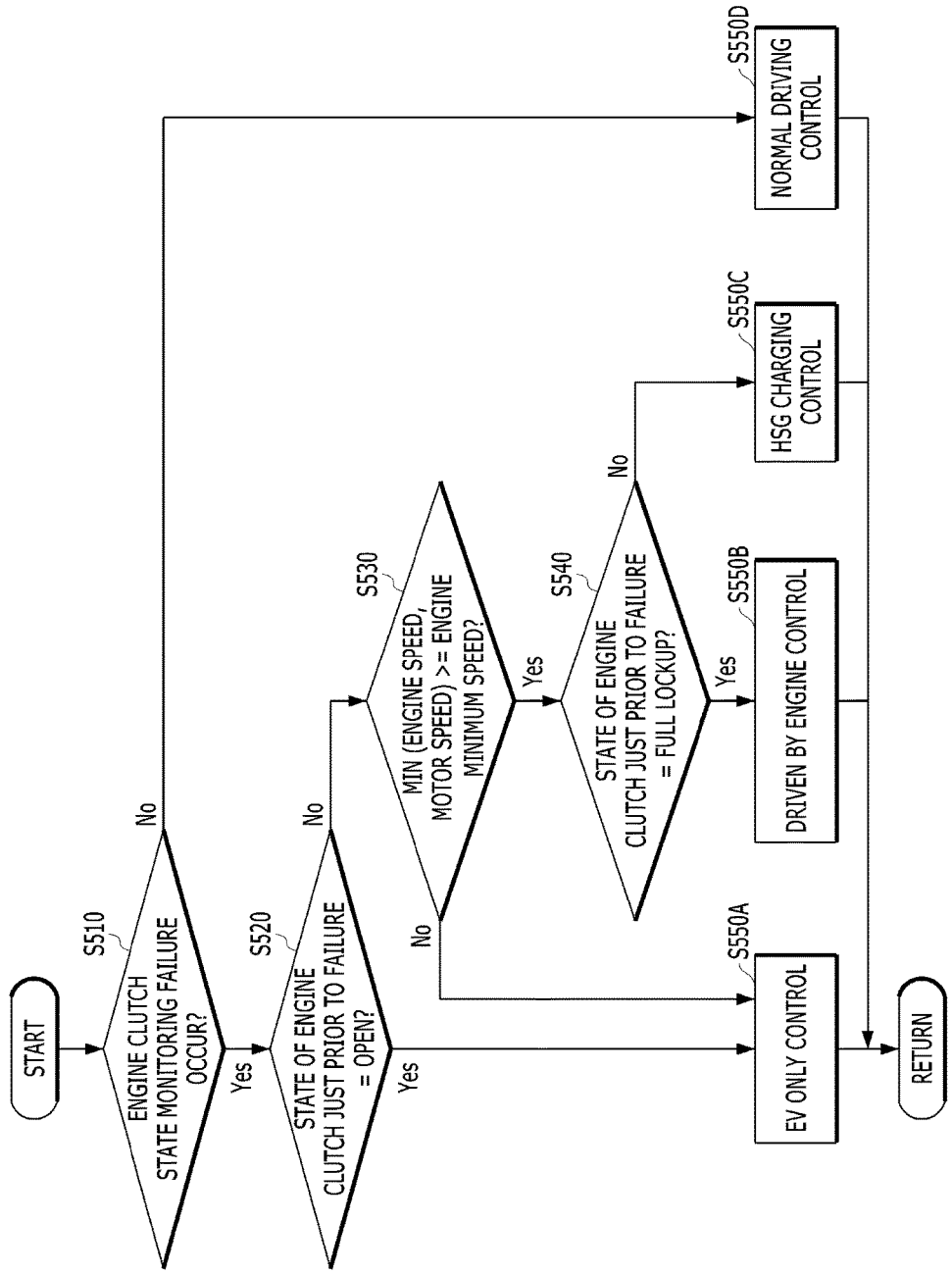
FIG. 5 is a flowchart exemplarily illustrating a method of controlling a powertrain in failure of an engine clutch in a hybrid electric vehicle in accordance with one embodiment of the present disclosure.

FIG. 5 is a flowchart exemplarily illustrating a method of controlling a powertrain in failure of an engine clutch in a hybrid electric vehicle in accordance with one embodiment of the present disclosure.

With reference to FIG. 5, whether or not failure in monitoring the state of an engine clutch occurs may be determined (S510). For example, if a value of a travel sensor of an HCA 310 cannot be acquired, a clutch control unit 230 may inform a hybrid control unit 240 of such fact by outputting a failure code, etc. Further, the hybrid control unit 240 may determine that failure of the engine clutch 130 occurs if the hybrid control unit 240 receives failure code information from the clutch control unit 230 or is unable to normally communicate with the clutch control unit 230.

Upon determining that failure of the engine clutch 130 occurs, the hybrid control unit 240 may identify a state of the engine clutch 130 which is finally obtained just prior to the failure (S520). Here, a state just prior to the failure may refer to the last state (i.e., the most recent state) that is identified by the hybrid control unit 240 before the failure of the engine clutch 130 is detected or determined by the hybrid control unit 240.

As a result of reference, if the engine clutch 130 is not in the open state, the hybrid control unit 240 may determine whether or not the engine is capable of starting (S530). Whether or not the engine is capable of starting may be determined based on that a lower value of an engine speed and a motor speed is the minimum starting speed of the engine or higher. Here, the minimum starting speed of the engine may mean the minimum RPM of the engine at which the engine is not stopped and starting of the engine may be maintained.

As a result of reference of the state of the engine clutch 130, if the engine clutch 130 is in the open state (yes in S520) or if the engine is incapable of starting (no in S530), EV only control in which the vehicle is driven using only driving power of the electric motor 140 may be performed (S550A).

Differently, if the engine is capable of starting (yes in S530), the hybrid control unit 240 may determine a way of using the power of the engine according to the state of the engine clutch 130 finally obtained just prior to the failure (S540).

In more detail, if the state of the engine clutch 130 obtained finally just prior to the failure is a lock-up state (yes in S540), the hybrid control unit 240 may perform control in which wheels are driven using power of the engine, i.e., HEV driving control (S550B). Here, engine torque may be defined as a value acquired by subtracting a designated margin from an engine clutch torque capacity just prior to the failure, and motor torque may be defined as a value acquired by subtracting the engine torque from demanded torque. If HEV control is performed, the hybrid electric vehicle may be continuously driven even in an engine clutch failure situation.

Differently, if the state of the engine clutch 130 determined finally just prior to the failure is a slip state (no in S540), the hybrid control unit 240 may perform control in which the HSG 120 is operated in a generator mode using the power of the engine 110 and thus charges the battery, i.e., HSG charging control (S550C). Here, engine torque is controlled to be equal to charging torque of the HSG 120 and, thus, torque transmitted to an input shaft of the engine clutch 130 may become substantially zero. This serves to minimize occurrence of slip of the engine clutch 130 and thus to prevent additional failure. Since engine torque is not transmitted to a drive shaft through the engine clutch 130, motor torque may be controlled to be equal to demanded torque. IF HSG charging control is performed, the battery is charged with power generated by the HSG 120 and a driving distance of the hybrid electric vehicle using the electric motor is increased.

Of source, if failure of the engine clutch 130 does not occur, normal driving control is performed (S550D).

Figure 6:
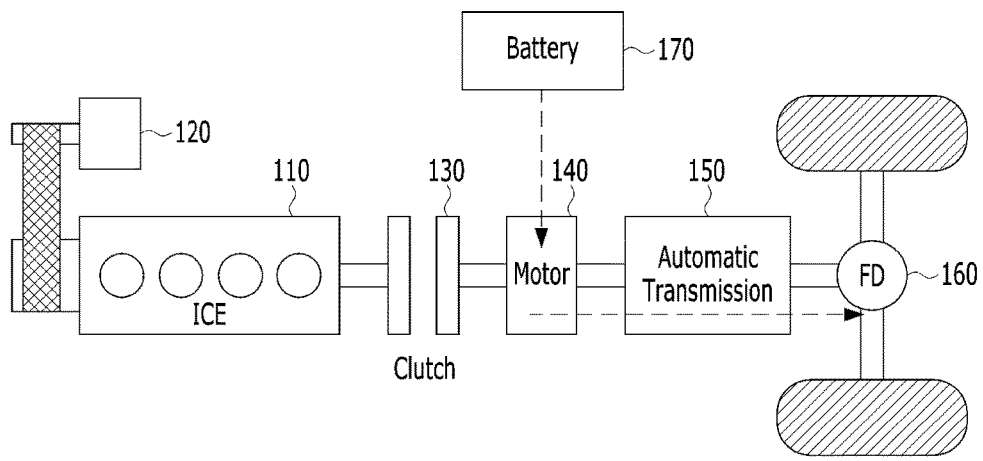
FIGS. 6 to 8 are views illustrating concepts of controlling a powertrain in respective situations in accordance with one embodiment of the present disclosure.
Figure 7:
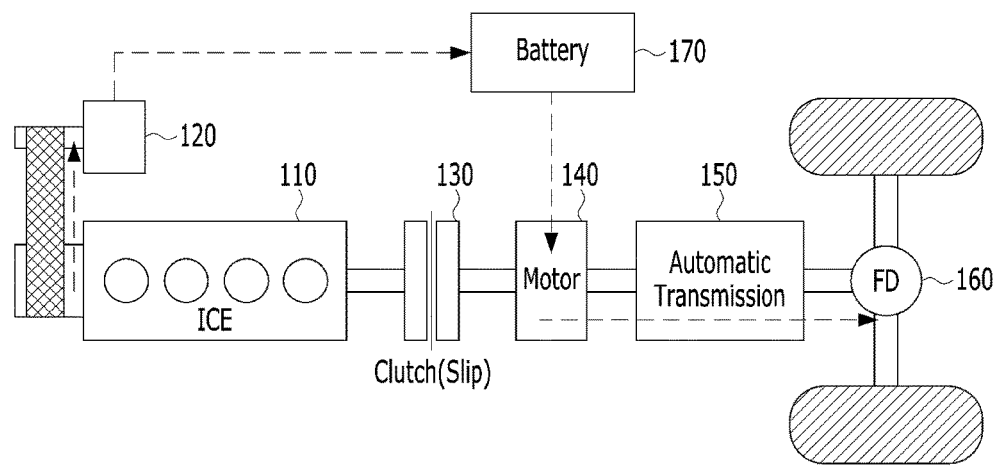
Figure 8:
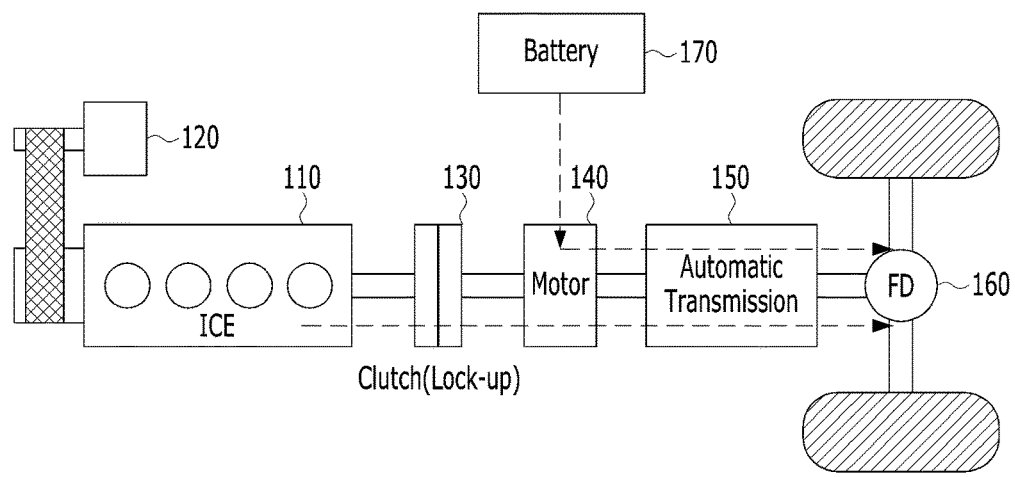

Table 1 below summarizes the above-described process shown in FIG. 5, and powertrain operations in respective controls will be described with reference to Table 1 and FIGS. 6 to 8. FIGS. 6 to 8 are views illustrating concepts of controlling a powertrain in respective situations in accordance with one embodiment of the present disclosure.

TABLE 1

| Engine clutch state just prior to failure (transfer torque) | Driving condition | Operating method |
| --- | --- | --- |
| Open state (<50 Nm) | always | EV only control |
| Slip state (50~250 Nm) | Satisfaction of speed enabling engine driving (engine & motor >= minimum engine speed) | HSG charging control (engine torque − HSG = 0, Feedforward control) |
| Lock-up state (>250 Nm) | Dissatisfaction of speed enabling engine driving | Engine off and EV only control |
| | Satisfaction of speed enabling engine driving (engine & motor >= minimum engine speed) | HEV mode driving (only, prevention of slip by restricting output using transfer torque just prior to failure-margin torque) |
| | Dissatisfaction of speed enabling engine driving | Engine off and EV only control |

(numbers in Table 1 are merely an example)

In Table 1, transfer torque may have a predetermined numerical value according to vehicles having respective characteristics and engine clutches having respective characteristics. Such information may be information which the hybrid control unit 240 acquires in advance, information which the clutch control unit 230 transmits to the hybrid control unit 240, or information predicted through state information of the engine clutch 130 which the hybrid control unit 240 finally receives.

First, FIG. 6 illustrates operation of the powertrain in EV only control. In EV only control, only the electric motor 140 is driven by power of the battery 170 regardless of the state of the engine clutch 130 but the internal combustion engine 110 is not started.

Further, in an HSG charging control situation, as exemplarily shown in FIG. 7, the engine clutch 130 is in a slip state, torque of the internal combustion engine 110 is controlled (feedforward control) to correspond to charging torque of the HSG 120 and, thus, slip of the engine clutch 130 is minimized. Power generated by the HSG 120 charges the battery 170, and the electric motor 140 is driven by power of the battery 170.

In an HEV mode driving situation, as exemplarily shown in FIG. 8, the engine clutch 130 is in a lock-up state, and driving power of the internal combustion engine 110 is transmitted to a drive shaft through the engine clutch 130 in the lock-up state and thus moves the vehicle together with driving power of the motor 140 driven by power of the battery 170. Here, output of the internal combustion engine 110 is restricted to a value acquired by subtracting designated margin torque from a torque capacity of the engine clutch 130 just prior to the failure. The reason for this is to prevent slip of the engine clutch 130 which may be generated if the torque of the internal combustion engine 110 is greater than a torque capacity of the engine clutch 130.

The above-described control according to the state of the engine clutch 130 has advantages as below.

If the state of the engine clutch 130 just prior to the failure is the open stage, there is a high possibility that the vehicle is driven at a low load, and an amount of energy necessary for evacuation to a safe zone is relatively small and thus there is a high possibility that the vehicle is moved to the safe zone.

If the state of the engine clutch 130 just prior to the failure is the slip state, energy necessary to drive the motor when the engine is capable of starting may be supplied through HSG charging and, thus, a driving distance may be increased, as compared to EV only control. Here, since engine torque is controlled to compensate for charging torque of the HSG 120, slip may be minimized and additional failure prevention effects may be expected.

Further, if the state of the engine clutch 130 just prior to the failure is the lock-up state, HEV mode driving is enabled and thus the vehicle may be continuously driven. Of course, even in this case, engine torque is maintained to be equal to or lower than transfer torque of the engine clutch 130 just prior to the failure and, thus, slip of the engine clutch 130 may be prevented.

The above-described method in accordance with the embodiment may be implemented as computer readable code in a computer readable recording medium in which a program is recorded. Computer readable recording media include all kinds of recording devices in which data readable by computer systems is stored. The computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc. Further, the computer readable recording media may be realized as a carrier wave (for example, transmission over the Internet).

The various embodiments disclosed herein, including embodiments of the hybrid control unit, the engine control unit, the motor control unit, the clutch control unit, and transmission control unit, or any other controller or control unit can be implemented using one or more processors coupled to a memory (or the above computer readable recording medium) storing computer-executable instructions for causing the processors to perform the functions described above including the functions described in relation to the hybrid control unit, the engine control unit, the motor control unit, the clutch control unit, and transmission control unit, or any other controller or control unit.

As is apparent from the above description, a hybrid electric vehicle in accordance with at least one embodiment of the present disclosure may secure a maximum driving distance in an engine clutch failure situation.

Particularly, power of an engine is actively used in consideration of transfer torque in an engine clutch state just prior to failure and, thus, a distance to empty (DTE) of the hybrid electric vehicle may be maximized.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of controlling a hybrid electric vehicle provided with an engine clutch installed between a first motor and an engine, the method comprising:
   in response to a determination that failure of the engine clutch occurs, determining a state of the engine clutch finally obtained before the failure;
   in response to a determination that the state of the engine clutch finally obtained before the failure is an open state, driving the first motor alone; and
   in response to a determination that the state of the engine clutch finally obtained before the failure is not the open state, starting the engine.

2. The method according to claim 1, wherein the starting of the engine includes:
   determining whether or not engine starting conditions are satisfied; and
   if the engine starting conditions are satisfied, starting the engine.

3. The method according to claim 2, wherein the engine starting conditions include that a lower value of a speed of the first motor and a speed of the engine is a minimum starting speed of the engine or higher.

4. The method according to claim 1, wherein the starting of the engine includes executing HEV mode driving control, in response to a determination that the state of the engine clutch finally obtained before the failure is a lock-up state.

5. The method according to claim 4, wherein the execution of the HEV mode driving control includes controlling torque of the engine to be less than or equal to torque acquired by subtracting designate margin torque from a torque capacity of the engine clutch finally obtained before the failure.

6. The method according to claim 5, wherein the execution of the HEV mode driving control further includes controlling torque of the first motor to correspond to a value acquired by subtracting the torque of the engine from demanded torque.

7. The method according to claim 1, wherein the starting of the engine includes executing second motor charging control to charge a battery by operating a second motor connected to the engine in a generator mode using power of the engine, in response to a determination that the state of the engine clutch finally obtained before the failure is a slip state.

8. The method according to claim 7, wherein the execution of the second motor charging control includes controlling torque of the engine to compensate for charging torque of the second motor.

9. The method according to claim 8, wherein the execution of the second motor charging control further includes controlling torque of the first motor to correspond to demanded torque.

10. A non-transitory computer readable recording medium having a program recorded therein to implement the method according to claim 1.

11. A hybrid electric vehicle comprising:
   a first controller configured to control a first motor;
   a second controller configured to control an engine;
   a third controller configured to control an engine clutch disposed between the first motor and the engine; and
   a fourth controller configured to:
      determine a state of the engine clutch finally obtained before the failure, if failure of the engine clutch is detected by the third control unit,
      in response to a determination that the state of the engine clutch finally obtained before the failure is an open state, control the first controller to drive the first motor alone, and
      in response to a determination that the state of the engine clutch finally obtained before the failure is not the open state, control the second controller to start the engine.

12. The hybrid electric vehicle according to claim 11, wherein the fourth controller confirms whether or not engine starting conditions are satisfied and starts the engine, if the engine starting conditions are satisfied.

13. The hybrid electric vehicle according to claim 12, wherein the engine starting conditions include that a lower value of a speed of the first motor and a speed of the engine is a minimum starting speed of the engine or higher.

14. The hybrid electric vehicle according to claim 11, wherein the fourth controller executes HEV mode driving control, in response to a determination that the state of the engine clutch finally obtained before the failure is a lock-up state.

15. The hybrid electric vehicle according to claim 14, wherein the fourth controller controls torque of the engine to be less than or equal to torque acquired by subtracting a designate margin torque from a torque capacity of the engine clutch finally obtained before the failure.

16. The hybrid electric vehicle according to claim 15, wherein the fourth controller controls torque of the first motor to correspond to a value acquired by subtracting the torque of the engine from demanded torque.

17. The hybrid electric vehicle according to claim 11, wherein the fourth controller executes second motor charging control to charge a battery by operating a second motor connected to the engine in a generator mode using power of the engine, in response to a determination that the state of the engine clutch finally obtained before the failure is a slip state.

18. The hybrid electric vehicle according to claim 17, wherein the fourth controller controls torque of the engine to compensate for charging torque of the second motor.

19. The hybrid electric vehicle according to claim 18, wherein the fourth controller controls torque of the first motor to correspond to demanded torque.

* * * * *